United States Patent
Shimizu et al.

(10) Patent No.: US 8,554,432 B2
(45) Date of Patent: Oct. 8, 2013

(54) POWER TRANSFER MECHANISM CONTROL DEVICE AND POWER TRANSFER DEVICE

(75) Inventors: Tetsuya Shimizu, Anjo (JP); Nobuyuki Hirai, Anjo (JP); Kenichi Tsuchida, Hazu-gun (JP); Kazunori Ishikawa, Toyota (JP)

(73) Assignee: Aisin AW Co., Ltd., Anjo (JP)

( * ) Notice: Subject to any disclaimer, the term of this patent is extended or adjusted under 35 U.S.C. 154(b) by 330 days.

(21) Appl. No.: 13/011,357

(22) Filed: Jan. 21, 2011

(65) Prior Publication Data
US 2011/0237395 A1    Sep. 29, 2011

(30) Foreign Application Priority Data
Mar. 29, 2010    (JP) ................................. 2010-075578

(51) Int. Cl.
G06F 7/00    (2006.01)
G06F 17/00    (2006.01)
G06F 19/00    (2011.01)

(52) U.S. Cl.
USPC ......... 701/67; 701/1; 701/68; 701/69; 701/51

(58) Field of Classification Search
None
See application file for complete search history.

(56) References Cited

U.S. PATENT DOCUMENTS

| | | | | |
|---|---|---|---|---|
| 4,364,343 A | * | 12/1982 | Malik | 123/179.4 |
| 4,630,577 A | * | 12/1986 | Cornacchia | 123/179.3 |
| 6,275,759 B1 | * | 8/2001 | Nakajima et al. | 701/54 |
| 6,316,842 B1 | * | 11/2001 | Kuroda et al. | 290/40 C |
| 6,676,565 B2 | * | 1/2004 | Mizutani | 477/111 |
| 6,730,000 B1 | * | 5/2004 | Leising et al. | 477/110 |
| 6,760,655 B2 | * | 7/2004 | Matsubara et al. | 701/54 |
| 6,973,383 B2 | * | 12/2005 | Mitsutani et al. | 701/112 |
| 7,130,731 B2 | * | 10/2006 | Itoh et al. | 701/54 |
| 7,159,572 B2 | * | 1/2007 | Mizutani | 123/491 |
| 7,273,027 B2 | * | 9/2007 | Mizutani | 123/179.16 |
| 2003/0045988 A1 | | 3/2003 | Suzuki et al. | |
| 2003/0171867 A1 | * | 9/2003 | Nakamori et al. | 701/54 |

FOREIGN PATENT DOCUMENTS

| | | |
|---|---|---|
| JP | A-2003-074683 | 3/2003 |
| JP | A-2003-240110 | 8/2003 |
| JP | A-2008-213686 | 9/2008 |
| JP | A-2009-287681 | 12/2009 |

OTHER PUBLICATIONS

Apr. 5, 2011 International Search Report issued in PCT/JP2011/053230 (with translation).

* cited by examiner

Primary Examiner — Bhavesh V Amin
(74) Attorney, Agent, or Firm — Oliff & Berridge, PLC

(57) ABSTRACT

A power transfer mechanism control device that controls a power transfer mechanism which is mounted on a vehicle including an automatically stoppable and automatically startable motor and which transfers power from the motor to an axle side via a friction engagement element actuated by a fluid pressure from a fluid pressure actuator, wherein during neutral control performed while the motor is in operation, a neutral control amount, which is a control amount for causing the friction engagement element to stand by in a neutral state with pressure lower than a complete engagement pressure, is set on the basis of a power transfer state of the power transfer mechanism to control the fluid pressure actuator, and learned, and while the motor is automatically stopped, the fluid pressure actuator is controlled using the learned neutral control amount such that the friction engagement element stands by in the neutral state.

5 Claims, 7 Drawing Sheets

|   |   | C1 | C2 | C3 | B1 | B2 | B3 | B4 | F1 | F2 | F3 |
|---|---|----|----|----|----|----|----|----|----|----|----|
|   | P |    |    |    |    |    |    |    |    |    |    |
|   | R |    |    | O  | (O)|    |    | O  | O  |    |    |
|   | N |    |    |    |    |    |    |    |    |    |    |
| D | 1st | O |    |    |    |    |    | (O)|    |    | O  |
|   | 2nd | O |    |    |    | (O)| O  |    | O  | O  |    |
|   | 3rd | O |    | O  | (O)|    | ●  |    | O  |    |    |
|   | 4th | O | O  | ●  |    |    | ●  |    |    |    |    |
|   | 5th |   |    | O  | O  | O  | ●  |    |    |    |    |

(O): ENGINE BRAKE IN OPERATION,
●: ENGAGED WITH NO TORQUE TRANSFERRED

F I G . 7
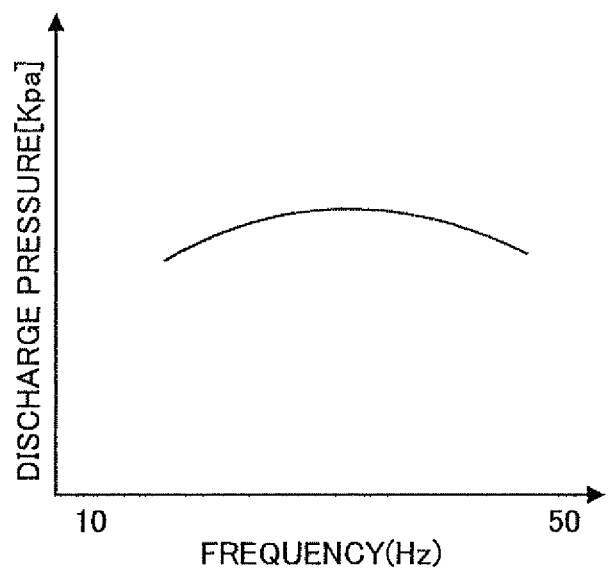
F I G . 8
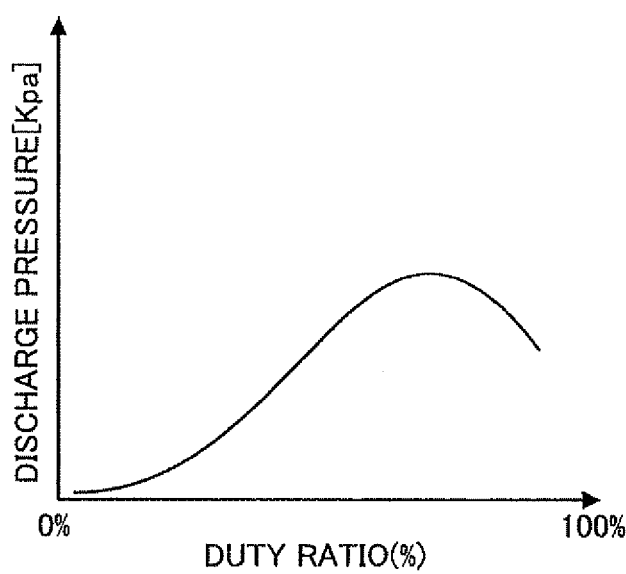

POWER TRANSFER MECHANISM CONTROL DEVICE AND POWER TRANSFER DEVICE

INCORPORATION BY REFERENCE

The disclosure of Japanese Patent Application No. 2010-075578 filed on Mar. 29, 2010 including the specification, drawings and abstract is incorporated herein by reference in its entirety.

BACKGROUND OF THE INVENTION

The present invention relates to a power transfer mechanism control device that controls a power transfer mechanism which is mounted on a vehicle including an automatically stoppable and automatically startable motor and which transfers power from the motor to an axle side via a friction engagement element actuated by a fluid pressure from a fluid pressure actuator, and also relates to a power transfer device including a power transfer mechanism and a control device that controls the power transfer mechanism.

DESCRIPTION OF THE RELATED ART

In the related art, as this type of the power transfer device, there has been proposed a power transfer device in which a mechanical oil pump actuated by power of an engine and an electric oil pump actuated by electric power are provided in parallel with each other as hydraulic pressure sources, and which performs control such that a standby pressure which is less than a line pressure generated when the engine is idling and which is equal to or more than an engagement start pressure at which a clutch starts transferring torque is applied to the clutch when the engine is stationary (see Japanese Patent Application Publication No. JP-A-2003-240110, for example). By setting the clutch pressure to the standby pressure discussed above while the engine is stationary, the device can quickly transfer the power of the engine to drive wheels when the engine is started in response to a request to start the vehicle, and the size of the electric oil pump is reduced as the same time.

SUMMARY OF THE INVENTION

It is necessary to appropriately manage the standby pressure of the clutch while the engine is stationary, because the clutch may slip to generate heat or wear a friction plate next time the engine is started if the standby pressure is set to be too high, and engagement of the clutch may be delayed next time the engine is started if the standby pressure is set to be too low. It is also desirable to manage the standby pressure for the clutch in consideration of secular deterioration of the clutch, because the proper standby pressure for the clutch may be changed by such secular deterioration.

It is a main object of a power transfer mechanism control device and a power transfer device according to the present invention to smoothly transfer power from a motor after the motor is automatically started by more appropriately managing the engagement state of a friction engagement element at the time when the motor is automatically stopped.

In order to achieve the foregoing main object, the power transfer mechanism control device and the power transfer device according to the present invention adopt the following means.

According to a first aspect, the present invention provides a power transfer mechanism control device in which during neutral control performed while the motor is in operation, a neutral control amount, which is a control amount for causing the friction engagement element to stand by in a neutral state with pressure lower than a complete engagement pressure, is set on the basis of a power transfer state of the power transfer mechanism to control the fluid pressure actuator, and learned, and while the motor is automatically stopped, the fluid pressure actuator is controlled using the learned neutral control amount such that the friction engagement element stands by in the neutral state.

In the power transfer mechanism control device according to the first aspect of the present invention, during neutral control performed while the motor is in operation, a neutral control amount, which is a control amount for causing the friction engagement element to stand by in a neutral state with pressure lower than a complete engagement pressure, is set on the basis of a power transfer state of the power transfer mechanism to control the fluid pressure actuator, and learned, and while the motor is automatically stopped, the fluid pressure actuator is controlled using the learned neutral control amount such that the friction engagement element stands by in the neutral state. Because a neutral control amount for causing the friction engagement element to stand by in a neutral state is learned during neutral control, and the friction engagement element is caused to stand by in the neutral state using the learned neutral control amount while the motor is automatically stopped, the friction engagement element can be brought to a state allowing the friction engagement element to be quickly engaged in its next engagement while the motor is automatically stopped, which allows smooth transfer of power from the motor after the motor is automatically started. In addition, the friction engagement element can be brought to a more appropriate state irrespective of secular changes. The "neutral state" includes not only a state in which a fluid pressure less than the stroke end pressure is applied to the friction engagement element so that the input side and the output side of the friction engagement element are disengaged from each other, but also a state in which a fluid pressure equal to or more than the stroke end pressure is applied to the friction engagement element so that a slight torque is transferred with some sliding between the input side and the output side of the friction engagement element. In this case, the engagement state of the friction engagement element during neutral control and the engagement state of the friction engagement element at the time when the motor is automatically stopped may be more or less differentiated from each other by correcting the neutral control amount at the time when the motor is automatically stopped from the neutral control amount during the neutral control. The "power transfer state of the power transfer mechanism" may be estimated from the engagement pressure of the friction engagement element, or for a power transfer mechanism whose input shaft is connected to an output shaft of the motor via a fluid transmission apparatus, may be estimated from the rotational state of the output shaft of the motor or the rotational state of the input shaft of the power transfer mechanism.

The power transfer mechanism control device according to a second aspect of the present invention includes, as the fluid pressure actuator, a first pump actuated by the power from the motor to generate a fluid pressure, a pressure regulator that regulates the fluid pressure from the first pump to supply the regulated fluid pressure to a fluid pressure servo for the friction engagement element, and a second pump actuated by supply of electric power to generate a fluid pressure and to supply the generated fluid pressure to the fluid pressure servo for the friction engagement element. In the power transfer mechanism control device, during the neutral control, the neutral control amount may be set such that the friction engagement element stands by in the neutral state to control the pressure regulator, and while the motor is automatically stopped, the second pump may be controlled using the learned neutral control amount such that the friction engagement element stands by in the neutral state. In this way, the friction engagement element can be brought to a state allowing the friction engagement element to be quickly engaged in its next engagement while the motor is automatically stopped, and the size of the power transfer mechanism can be reduced at the same time. The power transfer mechanism control device according to a third aspect of the present invention includes a switch actuated by the fluid pressure from the first pump to switch between a state in which connection is established between an output port of the pressure regulator and the fluid pressure servo for the friction engagement element and a state in which such connection is blocked. In the power transfer mechanism control device of this aspect, while the motor is automatically stopped, the pressure regulator may be caused to stand by with the learned neutral control amount. In this way, abrupt variations in the fluid pressure to be applied to the friction engagement element can be suppressed even if the switch establishes connection between the output port of the pressure regulator and the fluid pressure servo for the friction engagement element while the motor is automatically started. In the power transfer mechanism control device according to a fourth aspect of the present invention, the second pump may be formed as an electromagnetic pump that reciprocates a piston by repeatedly turning on and off an electromagnetic force to generate a fluid pressure, and when the motor is automatically stopped, at least one of a frequency and a duty ratio, at which the electromagnetic force is turned on and off, may be changed on the basis of the learned neutral control amount to control the electromagnetic pump. In this way, the electromagnetic pump can discharge the target fluid pressure with more accuracy.

In the power transfer mechanism control device according to a fifth aspect of the present invention, an input shaft of the power transfer mechanism may be connected to an output shaft of the motor and an output shaft of the power transfer mechanism is connected to the axle side, and the neutral control amount may be set through feedback control on the basis of a deviation between a rotational speed of the output shaft of the motor and a rotational speed of the input shaft of the power transfer device as the power transfer state to control the fluid pressure actuator, and learned.

In the power transfer mechanism control device according to a sixth aspect of the present invention, the neutral state may be a state in which a fluid pressure within a predetermined range including a stroke end pressure is applied to the fluid pressure servo for the friction engagement element.

According to a seventh aspect, the present invention also provides a power transfer device including: a power transfer mechanism that controls a power transfer mechanism which is mounted on a vehicle including an automatically stoppable and automatically startable motor and which transfers power from the motor to an axle side via a friction engagement element actuated by driving a fluid pressure actuator; and the power transfer mechanism control device according to any one of the aspects of the present invention discussed above which controls the power transfer mechanism.

Because the power transfer device according to the present invention includes the power transfer mechanism control device according to any one of the aspects of the present invention discussed above, the power transfer device according to the present invention can achieve the effect achieved by the power transfer mechanism control device according to the present invention. For example, the power transfer device according to the present invention can bring the friction engagement element to a state allowing the friction engagement element to be quickly engaged in its next engagement while the motor is automatically stopped, can allow smooth transfer of power from the motor after the motor is automatically started, can bring the friction engagement element to a more appropriate state irrespective of secular changes, can reduce the size of the entire device, and so forth.

BRIEF DESCRIPTION OF THE DRAWINGS

FIG. 7 shows an exemplary frequency setting map;

FIG. 8 shows an exemplary duty ratio setting map; and

DETAILED DESCRIPTION OF THE EMBODIMENT

An embodiment of the invention will be described below using an embodiment.

Figure 1:
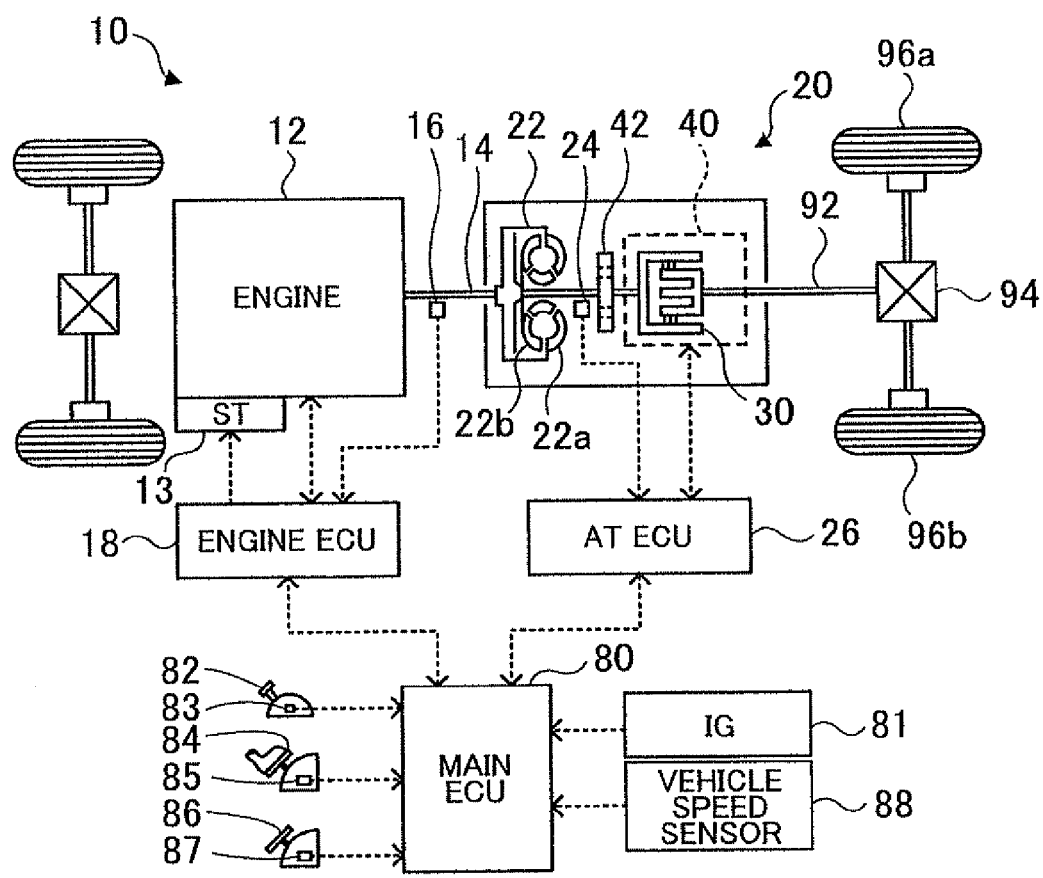
FIG. 1 is a diagram showing a schematic configuration of an automobile 10 incorporating a power transfer device 20 according to an embodiment of the present invention.
Figures 2, 3:
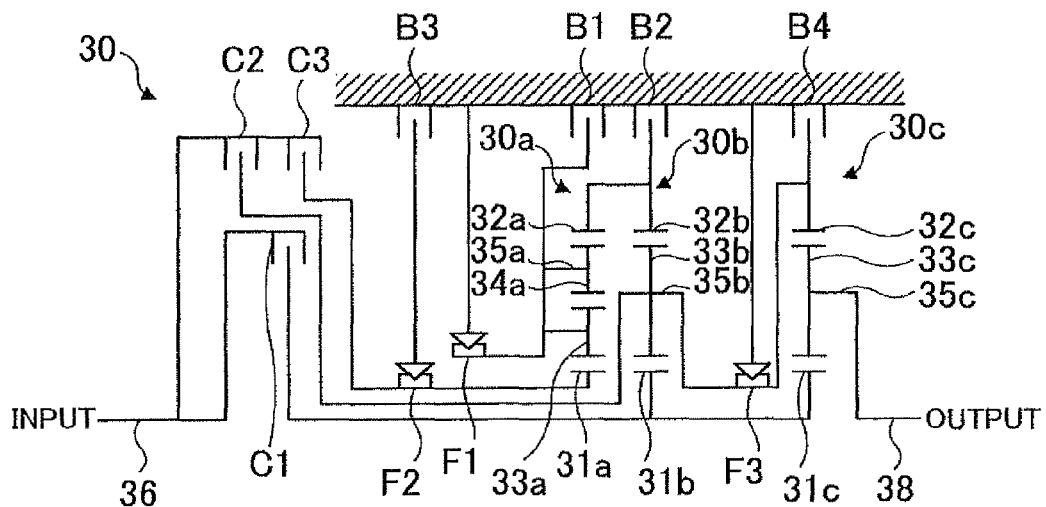
FIG. 2 is a diagram showing a schematic configuration of an automatic transmission 30 provided in the power transfer device 20 according to the embodiment.
FIG. 3 shows an operation table of the automatic transmission 30.

FIG. 1 is a diagram showing a schematic configuration of an automobile 10 incorporating a power transfer device 20 according to an embodiment of the present invention. FIG. 2 is a diagram showing a schematic configuration of an automatic transmission 30 provided in the power transfer device 20 according to the embodiment. FIG. 3 shows an operation table of the automatic transmission 30.

As shown in FIG. 1, the automobile 10 according to the embodiment includes an engine 12 which is an internal combustion engine that outputs power generated by explosive combustion of a hydrocarbon fuel such as gasoline and diesel oil, and the power transfer device 20 according to the embodiment which is connected to a crankshaft 14 of the engine 12 and connected to a drive shaft 92 coupled to left and right wheels 96a and 96b via a differential gear 94 to transfer the power from the engine 12 to the drive shaft 92.

Operation of the engine 12 is controlled by an engine electronic control unit (hereinafter referred to as an engine ECU) 18. Although not shown in detail in the drawings, the engine ECU 18 is formed as a microprocessor including a CPU as its main component, and includes a ROM that stores a processing program, a RAM that temporarily stores data, input and output ports, and a communication port in addition to the CPU. Signals from various sensors that are necessary to control operation of the engine 12, such as a rotational speed sensor 16 attached to the crankshaft 14, are input to the engine ECU 18 via the input port. A drive signal for a throttle motor that adjusts the throttle opening, a control signal for a fuel injection valve, an ignition signal for an ignition plug, a drive signal for a starter motor 13 that cranks the engine 12, and so forth are output from the engine ECU 18 via the output port. The engine ECU 18 communicates with a main electronic control unit (hereinafter referred to as a main ECU) 80 that controls the entire vehicle, and controls the engine 12 in accordance with a control signal from the main ECU 80 and outputs data on the operating state of the engine 12 to the main ECU 80 as necessary.

The power transfer device 20 according to the embodiment is formed as a transaxle device that transfers the power from the engine 12 to the drive shaft 92, and includes a torque converter 22, a mechanical oil pump 42, the automatic transmission 30, a hydraulic circuit 40, and an automatic transmission electronic control unit (hereinafter referred to as an AT ECU) 26. The torque converter 22 is provided with a lock-up clutch including a pump impeller 22a on the input side connected to the crankshaft 14 of the engine 12 and a turbine runner 22b on the output side. The mechanical oil pump 42 is disposed at a stage subsequent to the torque converter 22 to pump hydraulic oil using the power from the engine 12. The automatic transmission 30 is a hydraulically driven stepped automatic transmission including an input shaft 36 connected to the turbine runner 22b side of the torque converter 22 and an output shaft 38 connected to the drive shaft 92, and changes speed of the power input to the input shaft 36 and outputs the power at the changed speed to the output shaft 38. The hydraulic circuit 40 serves as an actuator that drives the automatic transmission 30. The AT ECU 26 controls the automatic transmission 30 (hydraulic circuit 40).

As shown in FIG. 2, the automatic transmission 30 includes a double-pinion type planetary gear mechanism 30a, two single-pinion type planetary gear mechanisms 30b and 30c, three clutches C1, C2, and C3, four brakes B1, B2, B3, and B4, and three one-way clutches F1, F2, and F3. The double-pinion type planetary gear mechanism 30a includes a sun gear 31a which is an external gear, a ring gear 32a which is an internal gear disposed concentrically with the sun gear 31a, a plurality of first pinion gears 33a meshed with the sun gear 31a, a plurality of second pinion gears 34a meshed with the first pinion gears 33a and meshed with the ring gear 32a, and a carrier 35a that couples the plurality of first pinion gears 33a and the plurality of second pinion gears 34a to each other and that holds the gears 33a and the gears 34a rotatably and revolvably. The sun gear 31a is connected to the input shaft 36 via the clutch C3, and either allowed to rotate freely or allowed to rotate only in one direction by engaging and disengaging the brake B3 connected to the sun gear 31a via the one-way clutch F2. The ring gear 32a is either allowed to rotate freely or held stationary by engaging and disengaging the brake B2. The carrier 35a is allowed to rotate only in one direction by the one-way clutch F1, and either allowed to rotate freely or held stationary by engaging and disengaging the brake B1. The single-pinion type planetary gear mechanism 30b includes a sun gear 31b which is an external gear, a ring gear 32b which is an internal gear disposed concentrically with the sun gear 31b, a plurality of pinion gears 33b meshed with the sun gear 31b and meshed with the ring gear 32b, and a carrier 35b that holds the plurality of pinion gears 33b rotatably and revolvably. The sun gear 31b is connected to the input shaft 36 via the clutch C1. The ring gear 32b is connected to the ring gear 32a of the double-pinion type planetary gear mechanism 30a, and either allowed to rotate freely or held stationary by engaging and disengaging the brake B2. The carrier 35b is connected to the input shaft 36 via the clutch C2, and allowed to rotate only in one direction by the one-way clutch F3. The single-pinion type planetary gear mechanism 30c includes a sun gear 31c which is an externally toothed gear, a ring gear 32c which is an internally toothed gear disposed concentrically with the sun gear 31c, a plurality of pinion gears 33c meshed with the sun gear 31c and meshed with the ring gear 32c, and a carrier 35c that holds the plurality of pinion gears 33c rotatably and revolvably. The sun gear 31c is connected to the sun gear 31b of the single-pinion type planetary gear mechanism 30b. The ring gear 32c is connected to the carrier 35b of the single-pinion type planetary gear mechanism 30b, and either allowed to rotate freely or held stationary by engaging and disengaging the brake B4. The carrier 35c is connected to the output shaft 38.

As shown in FIG. 3, the automatic transmission 30 can switchably establish first to fifth forward speeds, a reverse speed, and a neutral by engaging and disengaging the clutches C1 to C3 and engaging and disengaging the brakes B1 to B4. The first forward speed state, that is, a state at which rotation of the input shaft 36 is reduced in speed at the highest speed reduction ratio and transferred to the output shaft 38, can be established by engaging the clutch C1 and disengaging the clutches C2 and C3 and the brakes B1 to B4. When the engine brake is in operation with the first forward speed state established, the brake B4 is engaged to hold rotation of the ring gear 32c stationary in place of the one-way clutch F3. The second forward speed state can be established by engaging the clutch C1 and the brake B3 and disengaging the clutches C2 and C3 and the brakes B1, B2, and B4. When the engine brake is in operation with the second forward speed state established, the brake B2 is engaged to hold rotation of the ring gear 32a stationary and the ring gear 32b in place of the one-way clutch F1 and the one-way clutch F2. The third forward speed state can be established by engaging the clutches C1 and C3 and the brake B3 and disengaging the clutch C2 and the brakes B1, B2, and B4. The fourth forward speed state can be established by engaging the clutches C1 to C3 and the brake B3 and disengaging the brakes B1, B2, and B4. The fifth forward speed state, that is, a state in which rotation of the input shaft 36 is reduced in speed at the lowest speed reduction ratio (or increased in speed) and transferred to the output shaft 38, can be established by engaging the clutches C2 and C3 and the brakes B1 and B3 and disengaging the clutch C1 and the brakes B2 and B4. In the automatic transmission 30, the neutral state, that is, a state in which the input shaft 36 and the output shaft 38 are disengaged from each other, can be established by disengaging all of the clutches C1 to C3 and the brakes B1 to B4. The reverse state can be established by engaging the clutch C3 and the brake B4 and disengaging the clutches C1 and C2 and the brakes B1 to B3.

Figure 4:
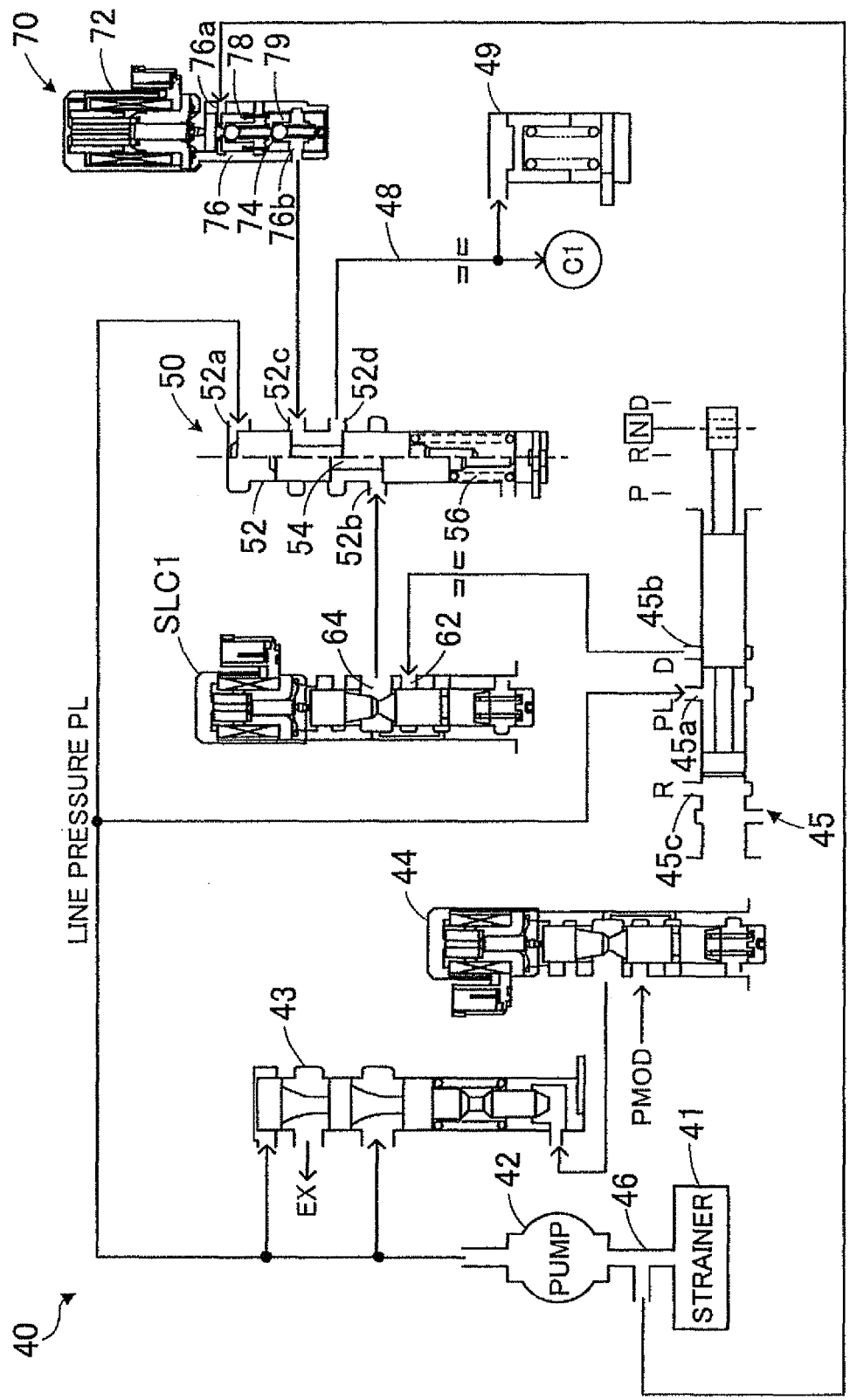
FIG. 4 is a partial configuration diagram showing a schematic configuration of a hydraulic circuit 40.

The clutches C1 to C3 and the brakes B1 to B4 in the automatic transmission 30 are engaged and disengaged by the hydraulic circuit 40. FIG. 4 is a partial configuration diagram showing a schematic configuration of a drive system for the clutch C1 in the hydraulic circuit 40. As shown in FIG. 4, the hydraulic circuit 40 is formed by: the mechanical oil pump 42 which sucks hydraulic oil from a strainer 41 and pumps the hydraulic oil using the power from the engine 12; a regulator valve 43 that adjusts the pressure (line pressure PL) of the hydraulic oil pumped from the mechanical oil pump 42; a linear solenoid 44 that drives the regulator valve 43 by regulating a modulator pressure PMOD generated from the line pressure PL via a modulator valve (not shown) to output the modulator pressure PMOD as a signal pressure; a manual valve 45' formed with an input port 45a to which the line pressure PL is input, a D (drive)-position output port 45b, an R (reverse)-position output port 45c, and so forth to establish and block communication between the respective ports in conjunction with an operation of a shift lever 82; a linear solenoid SLC1 that receives hydraulic oil from the D-position output port 45b of the manual valve 45 via an input port 62 and regulates the received hydraulic oil to output the regulated hydraulic oil from an output port 64; an electromagnetic pump 70 that suctions hydraulic oil from an suction port 76a via a suction check valve 78 by reciprocating a piston 74 in a cylinder 76 by turning on and off an electromagnetic force of an electromagnetic section 72 and discharges the suctioned hydraulic oil from a discharge port 76b via a discharge check valve 79; a switching valve 50 that selectively receives the hydraulic oil from the linear solenoid SLC1 and the hydraulic oil from the electromagnetic pump 70 and outputs the received hydraulic oil to a hydraulic servo for the clutch C1; an accumulator 49 attached to an oil passage 48 connected to the hydraulic servo for the clutch C1, and so forth. The suction port 76a of the electromagnetic pump 70 is connected to an oil passage 46 extending between the strainer 41 and the mechanical oil pump 42 so that the electromagnetic pump 70 suctions hydraulic oil from the oil passage 46 and discharges the hydraulic oil from the discharge port 76b. Hydraulic systems for the clutches other than the clutch C1, namely C2 and C3, and the brakes B1 to B4 do not constitute the core of the present invention, and thus are not shown in FIG. 4. Such hydraulic systems may be formed using a known linear solenoid and so forth.

As shown in FIG. 4, the switching valve 50 is formed by a sleeve 52 formed with various ports including a signal pressure input port 52a to which the line pressure PL is input as a signal pressure, an input port 52b connected to the output port 64 of the linear solenoid SLC1, an input port 52c connected to the discharge port 76b of the electromagnetic pump 70, and an output port 52d connected to the oil passage 48 for the clutch C1, a spool 54 that slides in the sleeve 52 in the axial direction, and a spring 56 that urges the spool 54 in the axial direction. In the switching valve 50, when the line pressure PL is applied to the signal pressure input port 52a, the line pressure PL exceeds the urging force of the spring 56 to push in the spool 54, which establishes communication between the input port 52b and the output port 52d and blocks communication between the input port 52c and the output port 52d. When the line pressure PL is not applied to the signal pressure input port 52a, on the other hand, the urging force of the spring 56 pushes out the spool 54, which blocks communication between the input port 52b and the output port 52d and establishes communication between the input port 52c and the output port 52d.

Although not shown in detail in the drawings, the AT ECU 26 is formed as a microprocessor including a CPU as its main component, and includes a ROM that stores a processing program, a RAM that temporarily stores data, input and output ports, and a communication port in addition to the CPU. A turbine speed Nt from a rotational speed sensor 24 attached to the input shaft 36, an output shaft speed Nout from a rotational speed sensor attached to the output shaft 38, and so forth are input to the AT ECU 26 via the input port. Drive signals for various solenoids such as the linear solenoid 44 and the linear solenoid SLC1, a drive signal for the electromagnetic pump 70, and so forth are output from the AT ECU 26 via the output port. The AT ECU 26 communicates with the main ECU 80, and controls the automatic transmission 30 (hydraulic circuit 40) in accordance with a control signal from the main ECU 80 and outputs data on the state of the automatic transmission 30 to the main ECU 80 as necessary.

Although not shown in detail in the drawings, the main ECU 80 is formed as a microprocessor including a CPU as its main component, and includes a ROM that stores a processing program, a RAM that temporarily stores data, input and output ports, and a communication port in addition to the CPU. An ignition signal from an ignition switch 81, a shift position SP from a shift position sensor 83 that detects the operation position of the shift lever 82, an accelerator operation amount Acc from an accelerator pedal position sensor 85 that detects the depression amount of an accelerator pedal 84, a brake switch signal BSW from a brake switch 87 that detects depression of a brake pedal 86, a vehicle speed V from a vehicle speed sensor 88, and so forth are input to the main ECU 80 via the input port. The main ECU 80 is connected to the engine ECU 18 and the AT ECU 26 via the communication port to exchange various control signals and data with the engine ECU 18 and the AT ECU 26.

In the thus configured automobile 10, if neutral control start conditions set in advance, such as the value of the vehicle speed V being zero, the accelerator turned off, the brake switch signal BSW turned on, and the engine 12 in operation, are all satisfied when the shift lever 82 is in the D (drive) position, neutral control (in-neutral control) in which the clutch C1 for the first forward speed is held at a fluid pressure around the stroke end pressure is executed until any of the above conditions is not satisfied.

If automatic stop conditions set in advance, such as the value of the vehicle speed V being zero, the accelerator turned off, the brake switch signal BSW turned on, and the engine 12 kept idling over a predetermined period of time, are all satisfied when the shift lever 82 is in the D (drive) position, the engine 12 is automatically stopped. After the engine 12 is automatically stopped, if automatic start conditions set in advance, such as the brake switch signal BSW turned off, are satisfied, the engine 12 which has been automatically stopped is automatically started.

Figure 5:
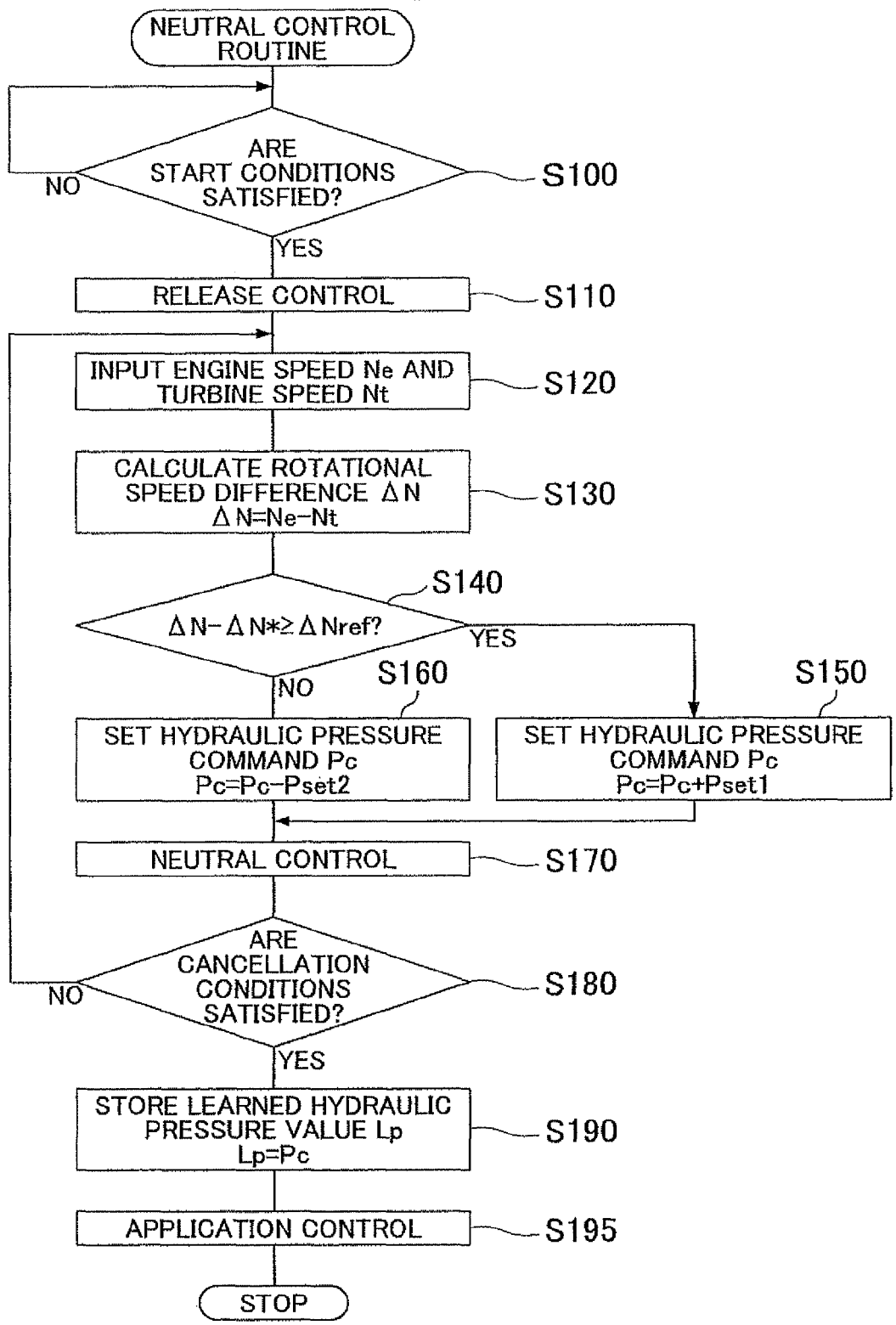
FIG. 5 is a flowchart showing an exemplary neutral control routine.

Next, operation of the power transfer device 20 according to the embodiment mounted on the thus configured automobile 10, specifically operation of the power transfer device 20 performed during neutral control and when the engine 12 is automatically stopped, will be described. Operation of the power transfer device 20 performed during neutral control will be described first, and operation of the power transfer device 20 performed when the engine 12 is automatically stopped will be described thereafter. FIG. 5 is a flowchart showing an exemplary neutral control routine executed by the AT ECU 26.

When the neutral control routine is executed, the CPU of the AT ECU 26 first waits for the neutral control start conditions discussed earlier to be satisfied (step S100). When the neutral control start conditions are satisfied, release control in which the engagement pressure of the clutch C1 is gradually reduced is executed (step S110). Subsequently, the engine speed Ne and the turbine speed Nt are input (step S120). A rotational speed difference $\Delta N$ (Ne−Nt) is calculated on the basis of a deviation between the engine speed Ne and the turbine speed Nt which have been input (step S130). A deviation ($\Delta N - \Delta N^*$) between the calculated rotational speed difference $\Delta N$ and a target rotational speed difference $\Delta N^*$ is compared with a threshold $\Delta Nref$ (step S140). If the deviation ($\Delta N - \Delta N^*$) is smaller than the threshold $\Delta Nref$, a new hydraulic pressure command Pc (current command) obtained by increasing the preceding hydraulic pressure command by a predetermined pressure Pset1 is set (step S150). If the deviation ($\Delta N - \Delta N^*$) is equal to or more than the threshold $\Delta Nref$, a new hydraulic pressure command Pc obtained by reducing the preceding hydraulic pressure command by a predetermined pressure Pset2 is set (step S160). Neutral control in which the linear solenoid SLC1 is driven on the basis of the newly set hydraulic pressure command Pc is executed (step S170). The target rotational speed difference $\Delta N^*$ is determined in advance as a difference between the engine speed and the turbine speed in a state in which a hydraulic pressure around the stroke end pressure is applied to the clutch C1. Thus, the clutch C1 can be caused to stand by at a fluid pressure around the stroke end pressure by increasing and reducing the hydraulic pressure command Pc such that the deviation ($\Delta N - \Delta N^*$) is in the range of the threshold $\Delta Nref$. Then, the process returns to step S120 to repeatedly execute neutral control in steps S120 to S170 until the neutral control cancellation conditions discussed earlier are satisfied (step S180). If the neutral control cancellation conditions are satisfied, the last hydraulic pressure command Pc (current command) set in either of steps S150 and S160 is stored in the RAM as a learned hydraulic pressure value Lp (step S190). Application control in which the hydraulic pressure to be supplied to the hydraulic servo for the clutch C1 is increased to engage the clutch C1 is executed (step S195). The routine is then terminated. The reason to store the learned hydraulic pressure value Lp will be discussed later. The neutral control routine has thus been described above.

Figure 6:
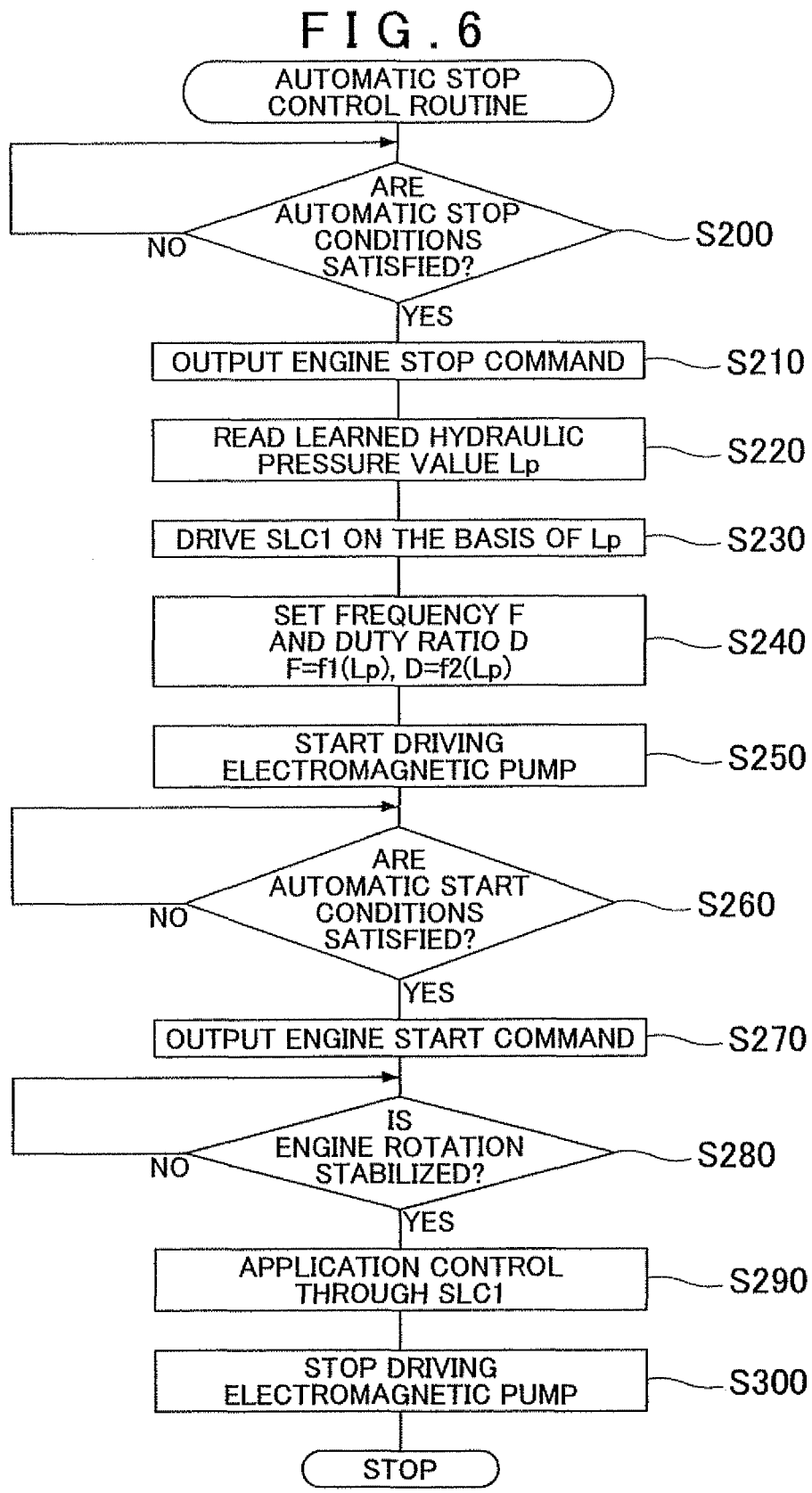
FIG. 6 is a flowchart showing an exemplary automatic stop control routine.

Next, control performed when the engine 12 is automatically stopped will be described. FIG. 6 is a flowchart showing an exemplary automatic stop control routine executed by the AT ECU 26. When the automatic stop control routine is executed, the CPU of the AT ECU 26 first waits for the automatic stop conditions discussed earlier to be satisfied (step S200). An engine stop command for stopping operation of the engine 12 is output to the engine ECU 16 via the main ECU 80 (step S210). Subsequently, the stored learned hydraulic pressure value Lp (current command) is read (step S220). The linear solenoid SLC1 is driven to stand by at the read learned hydraulic pressure value Lp (step S230). A frequency F and a duty ratio D are set on the basis of the read learned hydraulic pressure value Lp (step S240). The electromagnetic pump 70 starts being driven on the basis of the frequency F and the duty ratio D which have been set (step S250). In the embodiment, the frequency F for the electromagnetic pump 70 is set by obtaining the relationship between the discharge pressure and the frequency F in advance to store the obtained relationship in the ROM as a frequency setting map, and converting the given learned hydraulic pressure value Lp into a discharge pressure to derive a corresponding frequency F on the basis of the discharge pressure obtained through the conversion using the map. FIG. 7 shows an exemplary frequency setting map. In the embodiment, the duty ratio D is set by obtaining the relationship between the discharge pressure and the duty ratio D in advance to store the obtained relationship in the ROM as a duty ratio setting map, and converting the given learned hydraulic pressure value Lp into a discharge pressure to derive a corresponding duty ratio D on the basis of the discharge pressure obtained through the conversion using the map. FIG. 8 shows an exemplary duty ratio setting map. Then, the process waits for the automatic start conditions discussed earlier to be satisfied (step S260). An engine start command for starting the engine 12 is output to the engine ECU 16 via the main ECU 80 (step S270). The process waits for complete combustion to occur in the engine 12 and for rotation of the engine 12 to be stabilized (step S280). Application control in which the linear solenoid SLC1 is driven such that the hydraulic pressure to be applied to the hydraulic servo for the clutch C1 is gradually increased to completely engage the clutch C1 is executed (step S290). The electromagnetic pump 70 stops being driven (step S300). The routine is thus terminated. The determination as to whether rotation of the engine 12 has been stabilized can be performed by empirically obtaining in advance the period of time required for rotation of the engine 12 to be stabilized since the engine 12 is automatically started and determining whether or not the obtained period of time has elapsed, or by differentiating the engine speed Ne to obtain the speed change rate and determining whether or not the speed change rate has converged to a predetermined range around a value of 0. By driving the electromagnetic pump 70 to cause the clutch C1 to stand by at a hydraulic pressure around the stroke end pressure while the engine 12 is automatically stopped as described above, the clutch C1 can be quickly engaged immediately after the engine 12 is automatically started, which allows the vehicle to start smoothly. At this time, because the engine 12 has been automatically stopped, the clutch C1 cannot be caused to stand by at a hydraulic pressure around the stroke end pressure using the same method as used during neutral control. However, by controlling the electromagnetic pump 70 with the hydraulic pressure command Pc (learned hydraulic pressure value Lp) used during the neutral control, the clutch C1 can be caused to stand by at a hydraulic pressure around the stroke end pressure with more accuracy using the discharge pressure from the electromagnetic pump 70.

Figure 9:
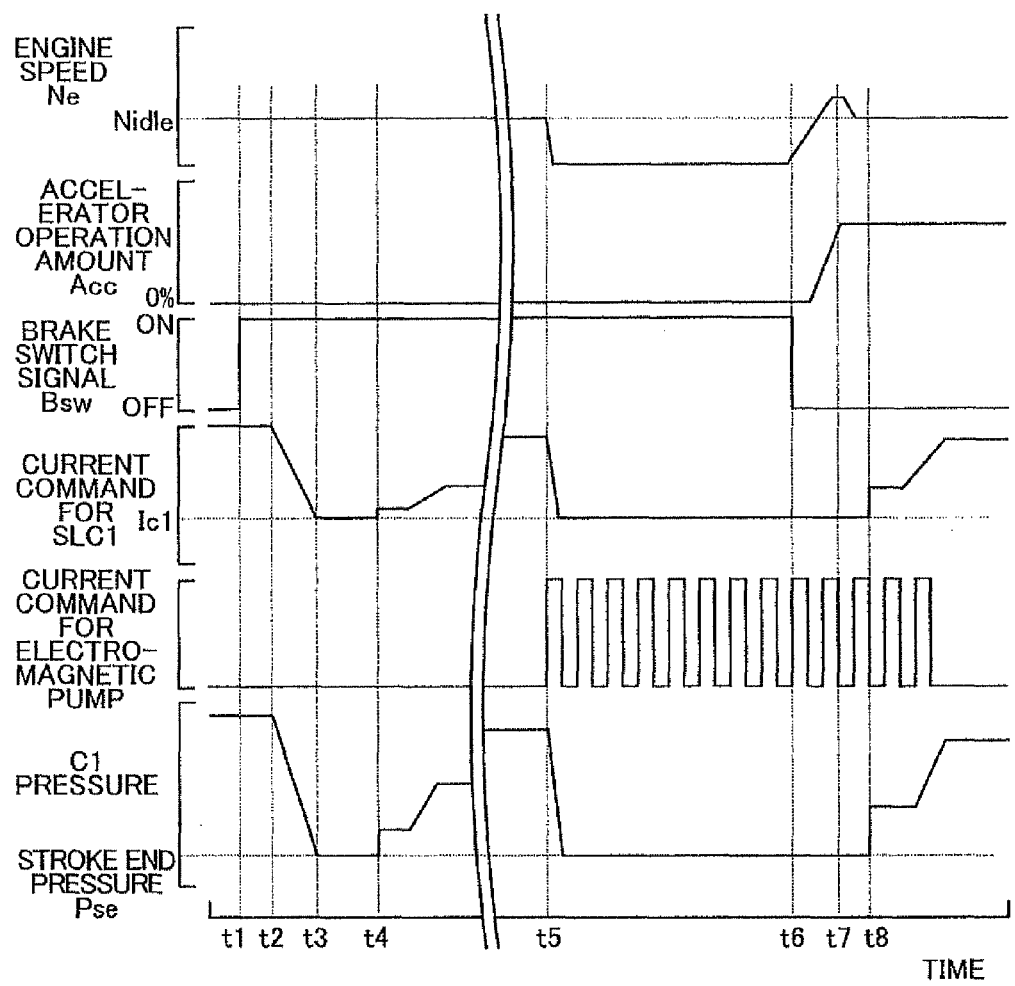
FIG. 9 shows temporal changes in engine speed Ne, accelerator operation amount Acc, brake switch signal BSW, current command for a linear solenoid SLC1, current command for an electromagnetic pump 70, and hydraulic pressure of a clutch C1 (C1 pressure).

FIG. 9 shows temporal changes in engine speed Ne, accelerator operation amount Acc, brake switch signal BSW, current command for the linear solenoid SLC1, current command for the electromagnetic pump 70, and hydraulic pressure of the clutch C1 (C1 pressure) according to the embodiment. As shown in the drawing, when the neutral control start conditions are satisfied at time t1, release control is executed at time t2. At time t3, at which the release control is completed, a hydraulic pressure command Pc (current command) is set through feedback control on the basis of the rotational speed difference $\Delta N$ between the engine speed Ne and the turbine speed Nt, and the linear solenoid SLC1 is driven on the basis of the set hydraulic pressure command Pc to cause the clutch C1 to stand by at a hydraulic pressure around the stroke end pressure (neutral control). Then, when the neutral control cancellation conditions are satisfied at time t4, application control in which the hydraulic pressure to be applied to the clutch C1 is gradually increased is executed. At this time, the last hydraulic pressure command Pc set during the neutral control is stored as the learned hydraulic pressure value Lp. When the automatic stop conditions for the engine 12 are satisfied at time t5, the electromagnetic pump 70 starts being driven. At this time, because the electromagnetic pump 70 is driven in accordance with the frequency F and the duty ratio D at which a discharge pressure obtained by converting the stored learned hydraulic pressure value Lp is obtained, the clutch C1 can be caused to stand by at a hydraulic pressure around the stroke end pressure. The linear solenoid SLC1 is driven on the basis of the learned hydraulic pressure value Lp (current command). Then, when the automatic start conditions for the engine 12 are satisfied at time t6, the starter motor 13 is driven to start cranking the engine 12. When the line pressure PL is generated along with rotation of the engine 12, the switching valve 50 is switched from a state in which connection is established between the discharge port 76b of the electromagnetic pump 70 and the oil passage 48 for the clutch C1 to a state in which connection is established between the output port 64 of the linear solenoid SLC1 and the oil passage 48 for the clutch C1 so that the hydraulic pressure output from the linear solenoid SLC1 is applied to the clutch C1. Because the linear solenoid SLC1 is driven on the basis of the learned hydraulic pressure value Lp, however, the hydraulic pressure to be applied to the clutch C1 does not change abruptly. When complete combustion occurs in the engine 12 (time t7) and rotation of the engine 12 is stabilized (time t8), application control in which the hydraulic pressure to be applied to the clutch C1 is gradually increased is executed to completely engage the clutch C1.

According to the power transfer device 20 of the embodiment described above, a hydraulic pressure command set through feedback control on the basis of the rotational speed difference ΔN between the engine speed Ne and the turbine speed Nt such that the clutch C1 stands by at a hydraulic pressure around the stroke end pressure during neutral control is stored as a learned hydraulic pressure value Lp, and the electromagnetic pump 70 is driven using the stored hydraulic pressure command (learned hydraulic pressure value Lp) when the engine 12 is automatically stopped, and the linear solenoid SLC1 is driven such that the hydraulic pressure to be applied to the clutch C1 is gradually increased to completely engage the clutch C1 when the engine 12 is automatically started. Thus, the clutch C1 can be more reliably caused to stand by at a hydraulic pressure around the stroke end pressure when the engine 12 is automatically stopped, which allows the clutch C1 to be quickly engaged immediately after the engine 12 is automatically started. As a result, the vehicle can start smoothly. Moreover, because a hydraulic pressure command set through feedback control during neutral control is used, the clutch C1 can be more reliably caused to stand by at a hydraulic pressure around the stroke end pressure irrespective of secular changes. In addition, while the engine 12 is automatically stopped, the linear solenoid SLC1 is driven on the basis of the stored hydraulic pressure command. Thus, even if the switching valve 50 is switched from a state in which connection is established between the discharge port 76b of the electromagnetic pump 70 and the oil passage 48 for the clutch C1 to a state in which connection is established between the output port 64 of the linear solenoid SLC1 and the oil passage 48 for the clutch C1 while the engine 12 is automatically started next time, abrupt changes in hydraulic pressure to be applied to the clutch C1 can be suppressed.

In the power transfer device 20 according to the embodiment, while the hydraulic pressure command Pc for the clutch C1 is set on the basis of the rotational speed difference ΔN (Ne−Nt) which is a deviation between the engine speed Ne and the turbine speed Nt during neutral control, the present invention is not limited thereto, and a hydraulic pressure sensor may be attached to an oil passage connected to the clutch C1, and the hydraulic pressure command Pc may be set such that the hydraulic pressure detected by the hydraulic pressure sensor is around the stroke end pressure.

In the power transfer device 20 according to the embodiment, while the electromagnetic pump 70 is driven on the basis of the frequency F and the duty ratio D set using the hydraulic pressure command Pc (learned hydraulic pressure value Lp) used during neutral control while the engine 12 is automatically stopped, it is not absolutely necessary to use the learned hydraulic pressure value Lp as it is, and the learned hydraulic pressure value Lp may be modified as appropriate before being used.

In the power transfer device 20 according to the embodiment, while the hydraulic pressure command Pc (learned hydraulic pressure value Lp) used during neutral control is used to set the frequency F and the duty ratio D for the electromagnetic pump 70 while the engine 12 is automatically stopped, the hydraulic pressure command Pc (learned hydraulic pressure value Lp) may be used to set either of the frequency F and the duty ratio D for the electromagnetic pump 70.

While application control in which the hydraulic pressure to be applied to the clutch C1 is gradually increased is started after complete combustion occurs in the engine 12 and rotation of the engine 12 is stabilized in the power transfer device 20 according to the embodiment, the application control may be started immediately after complete combustion occurs in the engine 12, or when the rotational speed of the engine 12 being cranked to start reaches a predetermined rotational speed or more.

While the discharge port 76b of the electromagnetic pump 70 is connected to the oil passage 48 for the clutch C1 via the switching valve 50 in the power transfer device 20 according to the embodiment, the discharge port 76b of the electromagnetic pump 70 may be directly connected to the oil passage 48 for the clutch C1.

While the switching valve 50 is driven using the line pressure PL in the power transfer device 20 according to the embodiment, the switching valve 50 may be driven using the modulator pressure PMOD obtained by reducing the line pressure PL via a modulator valve (not shown), or may be driven using a solenoid valve via which the line pressure PL or the modulator pressure PMOD is supplied to the switching valve 50.

The correspondence between the main elements of the embodiment and the main elements of the invention described in the "SUMMARY OF THE INVENTION" section will be described. In the embodiment, the engine 12 corresponds to the "motor". The automatic transmission 30 corresponds to the "power transfer mechanism". The hydraulic circuit 40 corresponds to the "fluid pressure actuator". The mechanical oil pump 42 corresponds to the "first pump". The linear solenoid SLC1 corresponds to the "pressure regulator". The electromagnetic pump 70 corresponds to the "second pump". The "motor" is not limited to an internal combustion engine that outputs power on a hydrocarbon fuel such as gasoline and diesel oil, and may be any type of internal combustion engine such as a hydrogen engine, or any type of motor that is automatically stoppable and automatically startable. The "power transfer mechanism" is not limited to the automatic transmission 30 which is a 5-speed automatic transmission that provides first to fifth forward speeds, and may be an automatic transmission that provides any number of speeds such as 4-speed, 6-speed, and 8-speed automatic transmissions. The "power transfer mechanism" is not limited to an automatic transmission, and may be any mechanism that can transfer power from a motor to an axle side via a friction engagement element, such as a mechanism connected to the crankshaft 14 of the engine 12 via a clutch and directly connected to the wheels 96a and 96b via the differential gear 94. The "electromagnetic pump" is not limited to an electromagnetic pump that pumps a hydraulic fluid to the clutch C1 which establishes the first forward speed, and may be an electromagnetic pump that, when a shift speed for starting the vehicle is set to a shift speed other than the first forward speed, pumps hydraulic oil to a clutch and a brake that establish the shift speed for starting the vehicle (such as the second forward speed) that is set to start the vehicle in accordance with a command from a driver or the running state of the vehicle. In the embodiment, the "pressure regulator" is configured as a direct-control linear solenoid valve that generates an optimum clutch pressure from the line pressure PL to directly control the clutch C1. However, a linear solenoid may be used as a pilot-control linear solenoid to drive a separate control valve, which generates a clutch pressure for controlling the clutch C1. The "control device" is not limited to a combination of the main ECU 80 and the AT ECU 26, and may be implemented by three or more electronic control units or a single electronic control unit. The correspondence between the main elements of the embodiment and the main elements of the invention described in the "SUMMARY OF THE INVENTION" section does not limit the elements of the invention described in the "SUMMARY OF THE INVENTION" section, because the embodiment is an example given for the purpose of specifically describing the mode described in the "SUMMARY OF THE INVENTION" section. That is, the invention described in the "SUMMARY OF THE INVENTION" section should be construed on the basis of the description in that section, and the embodiment is merely a specific example of the invention described in the "SUMMARY OF THE INVENTION" section.

While the embodiment for carrying out the present invention has been described above, it is a matter of course that the present invention is not limited to the embodiment in any way, and that the present invention may be implemented in various fowls without departing from the scope and sprit of the present invention.

The present invention may be applied to the automotive industry and so forth.

What is claimed is:

1. A power transfer mechanism control device that controls a power transfer mechanism which is mounted on a vehicle including an automatically stoppable and automatically startable motor and which transfers power from the motor to an axle side via a friction engagement element actuated by a fluid pressure from a fluid pressure actuator, the fluid pressure actuator comprising: i) a first pump actuated by the power from the motor to generate a fluid pressure, ii) a pressure regulator that regulates the fluid pressure from the first pump to supply the regulated fluid pressure to a fluid pressure servo for the friction engagement element, iii) a second pump actuated by supply of electric power to generate a fluid pressure and to supply the generated fluid pressure to he fluid pressure servo for the friction engagement element, and iv) a switch that is actuated by a fluid pressure from the first pump to selectively switch between a) a first state in which connection is established between an output port of the pressure regulator and a fluid pressure servo of the friction engagement element and b) a second state in which connection is established between a discharge port of the second pump and the fluid pressure servo of the friction engagement element,
   wherein:
   during neutral control performed while the motor is in operation, a neutral control amount, which is a control amount for causing the friction engagement element to stand by in a neutral state with pressure lower than a complete engagement pressure, is set on the basis of a power transfer state of the power transfer mechanism to control the fluid pressure actuator, and learned,
   while the motor is automatically stopped, the fluid pressure actuator is controlled using the learned neutral control amount such that the friction engagement element stands by in the neutral state, and
   during the neutral control, the neutral control amount is set such that the friction engagement element stands by in the neutral state to control the pressure regulator, and while the motor is automatically stopped, the second pump is controlled using the learned neutral control amount such that the friction engagement element stands by in the neutral state.

2. The power transfer mechanism control device according to claim 1, wherein:
   the switch actuated by the fluid pressure from the first pump switches between the first state in which connection is established between the output port of the pressure regulator and the fluid pressure servo for the friction engagement element and a state in which such connection is blocked, wherein
   while the motor is automatically stopped, the pressure regulator is caused to stand by with the learned neutral control amount.

3. The power transfer mechanism control device according to claim 1, wherein
   the second pump is formed as an electromagnetic pump that reciprocates a piston by repeatedly turning on and off an electromagnetic force to generate a fluid pressure, and
   while the motor is automatically stopped, at least one of a frequency and a duty ratio, at which the electromagnetic force is turned on and off, is changed on the basis of the learned neutral control amount to control the electromagnetic pump.

4. The power transfer mechanism control device according to claim 1, wherein
   an input shaft of the power transfer mechanism is connected to an output shaft of the motor and an output shaft of the power transfer mechanism is connected to the axle side, and
   the neutral control amount is set through feedback control on the basis of a deviation between a rotational speed of the output shaft of the motor and a rotational speed of the input shaft of the power transfer device as the power transfer state to control the fluid pressure actuator, and learned.

5. The power transfer mechanism control device according to claim 1, wherein the neutral state is a state in which a fluid pressure within a predetermined range including a stroke end pressure is applied to the fluid pressure servo for the friction engagement element.

* * * * *